Feb. 19, 1957  J. W. DUGAN  2,781,612
METHOD OF SOIL CONDITIONING AND FERTILIZING
Filed Feb. 27, 1953  2 Sheets-Sheet 1

John Warren Dugan
INVENTOR.

BY
Attorneys

Feb. 19, 1957 J. W. DUGAN 2,781,612
METHOD OF SOIL CONDITIONING AND FERTILIZING
Filed Feb. 27, 1953 2 Sheets-Sheet 2
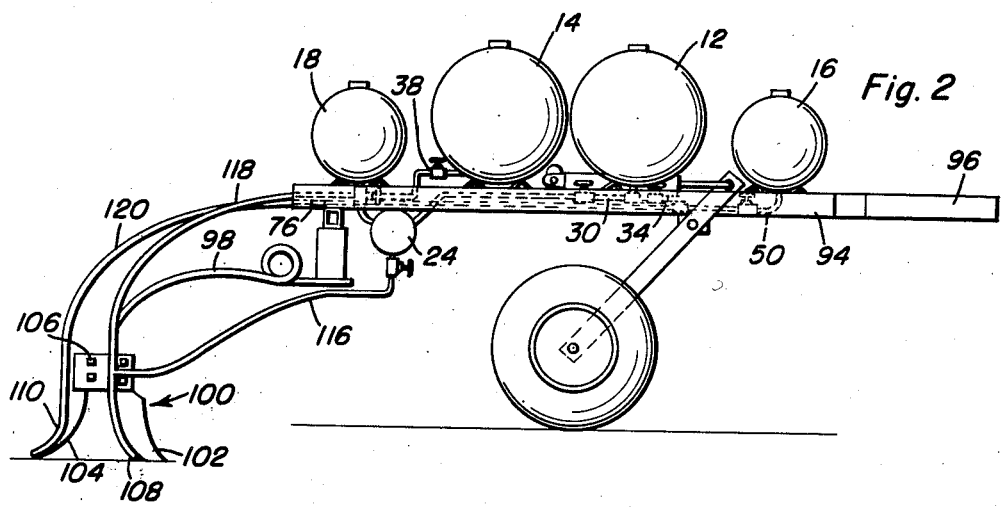
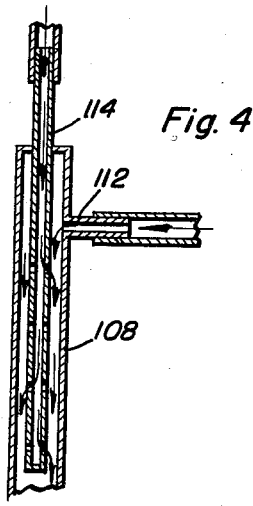
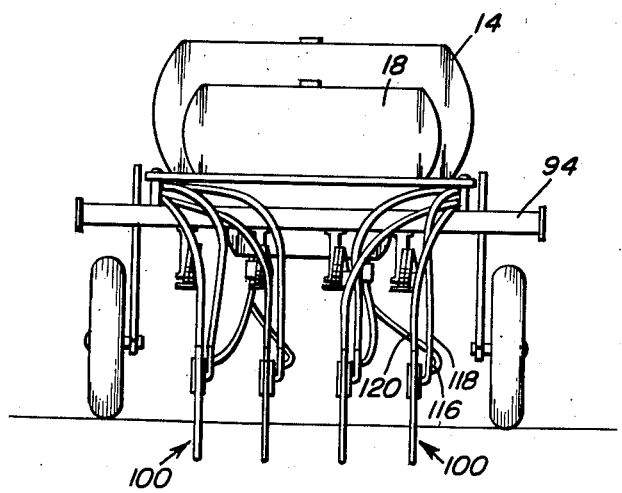
John Warren Dugan
INVENTOR.
BY *Clarence A. O'Brien
and Harvey B. Jacobson*
Attorneys

2,781,612
METHOD OF SOIL CONDITIONING AND FERTILIZING

John Warren Dugan, Houma, La., assignor to Flo-Mix Fertilizers Corporation, Houma, La., a corporation of Delaware Application February 27, 1953, Serial No. 339,217

5 Claims. (Cl. 47—58)

The present invention relates to a method of soil fertilization and more particularly relates to a new method of introducing fertilizer in liquid form into the soil.

The invention involves the control of the nitrogen, phosphorus and potassium factors of the soil by the subsurface application of these ingredients to the soil in liquid vehicles in the form of anhydrous or aqua ammonia, phosphoric acid and potash solution, respectively.

The primary object of this invention is the subsurface application of anhydrous ammonia, phosphoric acid and potash solution, selectively, sequentially, simultaneously or in various combination streams, in such a manner that the concentrations of the streams of fertilizing liquids may be varied after they are released from their containers and prior to their entrance into the soil but during their passage toward the soil.

Another very important object of the invention is the formation of supersaturated solutions of ammonium and/or potassium phosphates in anhydrous ammonia through the blanketing of a stream of anhydrous ammonia with a stream of phosphoric acid and/or potash solution during the passage of, but prior to, the entrance of these streams into the soil. Likewise, dilute solutions of the phosphoric acid and the potash may be mixed together in the same manner with the acid blanketing the potash solution.

Experiments indicate that preplanting fertilization produces the greatest increase in productivity per pound of fertilizer used. At present, most preplanting fertilization which is done to regulate the nitrogen, phosphorus and potassium factors is done with solid fertilizers. Although these fertilizers are effective, production costs and man hours per acre required become prohibitive and substantially increase the production cost per acre in comparison to the increase in yield per acre obtained.

Recent attempts to overcome the above difficulties have brought about the use of liquid fertilizers; but those produced to date have been a costly source of soil nutrients principally because of the expense involved in production and transportation charges on dead weight. Also, these solutions fail to make any provisions for changes in concentration of the liquids necessitated by various soil conditions without prohibitive expense.

In carrying out the concepts of the present invention the soil nutrients, anhydrous ammonia, phosphoric acid and a solution of potash in water are delivered to their point of use in highly concentrated forms in commercially available containers. Nutrient containers and an additional water container are mounted on a suitable mobile frame, nutrients and water are placed in their respective containers, and the subsurface application may begin. Obviously, the physical and chemical conditions of the soil determines the concentration, amounts and the types of fertilizer that can be readily assimilated. Whether the soil is wet or dry, friable or cohesive, ploughed or unploughed, acid or alkali, deficient in one or more of the plant nutrients, etc., are all factors that must be taken into consideration in determining the amount of anhydrous ammonia and the concentration of phosphoric acid and/or potash solution to be used in the particular soil.

The crop to be planted is also determinative of the fertilization needed. Thus, in certain crops and in certain soils the nitrogen factor exerts more control on yield than the phosphorus or potassium factors. Other crops and other soils require the control of two or three of the factors for greater yield. Conditions also exist under which greater yield usually is accomplished by the replenishment of only one factor of the soil, but this greater yield accelerates the depletion of other factors and after a temporary increase in yield a decrease in yield is experienced. By controlling the concentration of the streams of anhydrous ammonia, phosphoric acid and potash solution as they are directed into the soil, the aforementioned variables may be accurately controlled.

As the mobile frame is moved over an area to be fertilized, conduits from the various containers direct the liquid solutions towards the soil. During their passage through the conduits, the concentration of the streams may be changed as necessitated by dilution of the streams with water. After their entrance into the soil, the chemicals react with one another and with the chemicals already present in the soil to form within the soil itself ammonium and potassium phosphates as well as other compounds.

To control the acidity of the soil, the ammonia and the potash solution may first be introduced into the soil and the phosphoric acid added sequentially. Thus, the acidity of the phosphoric acid will be respectively counteracted by the alkalinity of the ammonia and the potash solution and solid phosphates will be formed only in the soil. Further, the streams of ammonia and the potash solution may be combined prior to their entrance into the soil since there is no chemical reaction on the mixing of these streams. In this connection, it is to be particularly noted that the phosphoric acid will react immediately with the alkaline substances already in the soil to form both organic and inorganic phosphates.

By using a dilute solution of phosphoric acid to blanket a stream of anhydrous ammonia, nitrogen in the form of anhydrous ammonia and ammonium phosphates, and phosphorus in the form of ammonium phosphates are added to the soil as a solution in anhydrous ammonia. Likewise, the potassium salt of the phosphoric acid may be maintained in the solution by blanketing a stream of potash solution with a dilute stream of phosphoric acid or by blanketing a stream of anhydrous ammonia with dilute solutions of phosphoric acid in potash solution. In both these last mentioned instances, as well as the prior instances, supersaturated solutions are formed in which the phosphate salts are not permitted to precipitate. Of course, upon entrance of the solution into the soil, normal conditions are assumed and the salts are precipitated and the surplus chemicals permitted to react with the soil chemicals.

It is also possible to introduce any one of the liquid streams in any desired concentration to the exclusion of the other streams.

The permutations of the system are obviously many and may be varied according to the soil characteristics. Present liquid fertilizing processes for the most part utilize a fixed amount of chemicals and variations, although possible, are not economically feasible. With the present invention, the amount of nitrogen, phosphorus and potassium may be varied depending upon the physical and the chemical characteristics of the soil as well as upon the chemical changes to be produced in the soil by the addition of these chemicals.

Present methods for the production of liquid fertilizers with high percentages of the soil nutrients which it is proposed to add to the soil consist essentially of using the primary substances, anhydrous ammonia, phosphoric acid and potash, processing them through stage chemical reactions and treatments at a manufacturing plant (for example, the conversion of anhydrous ammonia into aqua ammonia and ammonium nitrate and then using a solution of aqua ammonia and ammonium nitrate to form a liquid fertilizer with a high percentage of available nitrogen) to obtain solutions containing high percentages of available nutrients. The liquid solutions after manufacture at the plant and until applied to the soil require special handling, constant mixing, controlled temperature and pressure, to prevent precipitation of salts from solution or separation of dissolved salts. By means of the processes of the present invention set forth above, liquid fertilizers containing high percentages of available nutrients are formed in moving streams and deposited in the soil immediately after formation, thus eliminating all the intermediate manufacturing and handling operations, or the streams are applied to the subsurface of the soil and the chemical reactions take place within the soil, which is the direct accomplishment of the ultimate objective of all fertilizing operations. These moving streams are under temperature and pressure conditions which allow solutions to exist, which are normal temperature and pressure conditions would be supersaturated solutions, and which when released within the soil immediately precipitate salts.

Suitable apparatus for carrying out the process of the present invention is shown in the accompanying drawings wherein:

Figure 2 is a side elevational view of a mobile apparatus for carrying out the process;

Figure 3 is a rear elevational view of the mobile apparatus shown in Figure 2; and Figure 4 is a sectional view of one of the solution mixing tubes.

Referring now to the accompanying drawings in detail, it will be noted that like reference numerals are utilized to designate similar parts throughout the various views.

Figure 1:
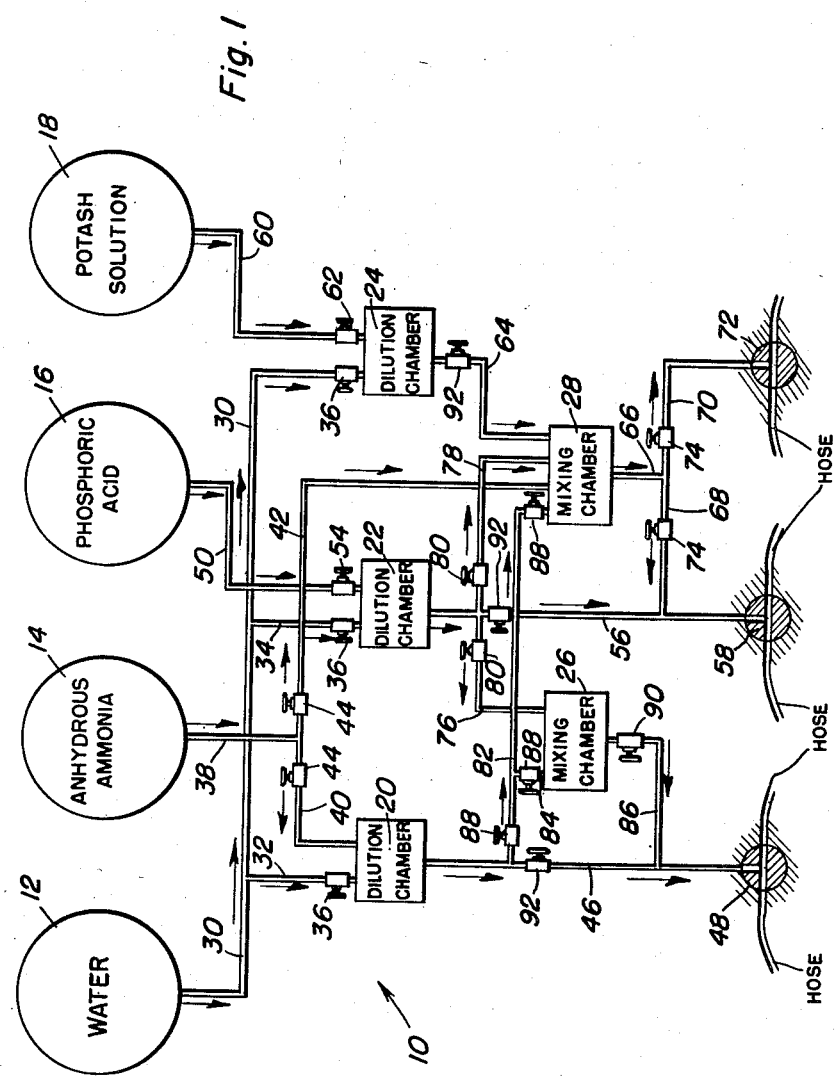
Figure 1 is a flow diagram of the conduit system for supplying the various nutrients to the applicators.

Reference will first be had to Figure 1 of the drawings wherein the supply system for carrying out the principles of the invention is designated in its entirety by the numeral 10. As will be noted from an inspection of Figure 1, the system 10 includes a water tank or container 12, an anhydrous ammonia tank or container 14, a phosphoric acid tank 16 and a potash solution tank or container 18.

Also included in the supply system 10 are three dilution chambers 20, 22 and 24, respectively, and two mixing chambers 26 and 28, respectively.

Beginning with the water tank 12, it will be seen that the piping on this tank consists of a main conduit 30 opening into the dilution chamber 24 and a pair of branch conduits 32 and 34 extending from the main conduit and opening into the dilution chambers 20 and 22, respectively. Suitable valves 36 are provided on the conduit 30 and branch conduits 32 and 34 for controlling the flow of water to each and to all the dilution chambers.

From the anhydrous ammonia container 14 extends a primary conduit 38 terminating a pair of branch conduits 40 and 42 with the conduit 40 opening into the dilution chamber 20 and the conduit 42 opening into the mixing chamber 28. Valves 44 are provided on the branch conduits 40 and 42 so that the flow of ammonia through the primary conduit 38 may be selectively directed to the dilution chamber 20 or the mixing chamber 28. From the dilution chamber 20 extends a conduit 46 which leads directly to an adaptor 48 from which the anhydrous ammonia or aqueous solution of ammonia may be injected directly into the soil. From the phosphoric acid container 16 extends a primary conduit 50 which opens into the dilution chamber 22. Valve 54 is provided on this conduit to control the flow of acid into the dilution chamber 22.

From the dilution chamber 22 extends a secondary conduit 56 which terminates in an adaptor 58 from whence phosphoric acid, either concentrated or diluted may be injected directly into the soil.

From the potash solution container extends a primary conduit 60 opening into the dilution chamber 24, which conduit is provided with a valve 62 for controlling the flow of the potash solution into the dilution chamber.

Extending from the dilution chamber 24 is a secondary conduit 64 opening into the mixing chamber 28. From the mixing chamber 28 extends a tertiary conduit 66 terminating in a pair of branch conduits 68 and 70 with conduit 68 opening into the conduit 56 and the conduit 70 opening into an adaptor 72. Valves 74 are provided on the branch conduits 68 and 70 for selectively directing the flow from the mixing chamber 28 to either the adaptor 58 or the adaptor 72.

From the conduit 56 extend a pair of branch conduits 76 and 78 respectively with conduits 76 opening into the mixing chamber 26 and the conduit 78 opening into the mixing chamber 28. Valves 80 are provided on the conduits 76 and 78 respectively for selectively controlling the flow of phosphoric acid from the dilution chamber 22 to either the mixing chamber 26 or the mixing chamber 28.

From the conduit 46 extends a branch conduit 82 opening into the mixing chamber 28 intermediate the ends of this branch conduit 82 is a connecting conduit 84 opening into the mixing chamber 26. From the mixing chamber 26 extends another conduit 86 which opens in the lower portion of the conduit 46.

Valves 88 on the branch conduit 82 and the connecting conduit 84 respectively control the flow initially from the conduit 46 to the branch conduit 82 and thence selectively control the flow of ammonia from the branch conduit 82 to either the mixing chamber 26 or the mixing chamber 28. Valve 90 on the conduit 86 controls the return of fluid from the mixture chamber 26 to the conduit 46.

The second conduits 46, 56 and 64, respectively, are also provided with valves 92 to control the direct flow through these conduits to the adaptors 48, 58 and 72, respectively.

From the adaptors 48, 58 and 72 flexible hoses are extended either singularly and individually to a supply pipe attached to each one in sets of three applicator feet, or two of a pair of the adaptors have flexible hoses extending therefrom to the two supply pipes 112 and 114 when the type applicator shown in Figure 4 is used, and the third adaptor is connected to an applicator foot with a single tube, or each adaptor is connected to one of the three supply pipes on an applicator foot 100 of the type shown in Figure 2 of the drawings.

With this arrangement it can be seen that ammonia in any concentration or dilution or anhydrous and/or phosphoric acid and/or potash solution may be initially distributed through the adaptors 48, 58 and 72, respectively. Also, by judicious manipulation of the valves around dilution chambers 20 and 22 and mixing chamber 26, various selected concentrations of water, anhydrous ammonia and phosphoric acid may be mixed and distributed through the adaptor 48. Similar adjustments of the valves around the dilution chambers 22 and 24 and the mixing chamber 28 will permit the flow through the mixing chamber 28 of various concentrations of water, phosphoric acid and potash solution which may then be distributed through either of the adaptors 58 and 72. Likewise, the flow of anhydrous ammonia and potash solution may be directed through the mixing chamber 28 and the adaptors 58 and 72 to the exclusion of phosphoric acid solution.

Thus, with this arrangement, various concentrations of the essential soil nutrients, nitrogen, phosphorus and potassium may be injected directly into the soil through the supply system 10.

Noting Figure 2, the tanks 12, 14, 16 and 18 together with their piping system are shown mounted on a suitable wheeled frame 94 having a tongue 96 at the forward end thereof by means of which the frame 94 may be towed by a tractor or the like. Secured to and depending from the rear end of the frame are a plurality of transversely spaced tool bars 98 upon which the applicators 100 are mounted. As will be noted, each applicator 100 comprises front and rear plow feet 102, 104 respectively, secured to one another and to the tool bar 98 at their upper ends by means of the attaching plates 106. The plow feet 102 and 104 are in the form of cutting blades having forward or leading edges formed with cutting surfaces for penetrating the ground surface whereas the trailing edge of each of the plow feet has an open ended pipe welded thereto, the pipe 108 being welded to the trailing edge of the forward plow foot 102 and the pipe 110 being welded to the rear plow foot 104 at its trailing edge. A branch pipe or conduit 112 opens into the side wall of the conduit 108 while the ammonia induction pipe extends concentrically within the pipe 108 and is designated by the numeral 114. It is to be noted that this portion of the apparatus, namely, the forward plow foot 102, pipe 108, branch conduit 112 and the concentric pipe 114 are substantially identical to that described in my co-pending application Serial No. 318,063, filed October 31, 1952.

Flexible conduits 116, 118 and 120 interconnect the pipes 108 and 110 as well as the branch conduit 112 with the piping arrangement leading from the nutrient containers. The hose 116 is primarily for the potash solution, the hose 118 for the ammonia and hose 120 for the phosphoric acid.

Since the manner of interconnecting the tanks with one another and diluting the solutions of the tanks is believed to be adequately set forth in the flow diagram of Figure 1, only so much of this structure as is necessary to the functioning of the apparatus as shown in Figures 2-4. However, the primary conduits leading from each tank are designated by the same numerals utilized in the description of the flow sheet shown in Figure 1.

As the frame is drawn over the ground the plow feet penetrate the soil and by manipulating the valves, either two or three separate streams consisting of anhydrous ammonia, of phosphoric acid and of potash solution, each either undiluted or diluted with water is injected into the subsoil below the surface.

It will be noted that although the streams are injected separately, they may be injected approximately simultaneously. In fact, it is intended for the alkaline solution to go as far as possible upsetting the original equilibrium of the soil before it is reached by the phosphoric acid, and phosphor salts are formed in the soil not only with the alkaline solution injected but also with the anorganic and organic compounds of the soil itself, thus forming complex compounds which are easily absorbed by the plants.

Although as shown in the preferred embodiment, the applicators are arranged in side by side relation transverse to the direction of movement of the frame, it is to be understood that these may be arranged in longitudinally spaced relation with respect to the movement of the frame or in various angled positions according to the desires of the operator.

It is to be noted that no attempt has been made to show pressure regulation, flow control, etc., since these features are dependent upon the manner in which the apparatus is to be mounted and equipment capable of performing these functions is already well known in the art.

From the foregoing description, the principles of the invention will be readily apparent. However, since numerous modifications and changes will occur to those skilled in the art after a perusal of the foregoing specification taken in conjunction with the accompanying drawings, it is not desired to limit the invention to the exact embodiment set forth herein, but all suitable modifications and changes may be resorted to that fall within the scope of the appended claims.

What is claimed as new is as follows:

1. A process of soil fertilization which comprises directing a stream of liquid ammonia toward the soil, blanketing the stream of ammonia with a solution of potash and water just prior to application to the soil, injecting the resultant solution into the soil beneath the surface thereof, then sequentially injecting a stream of phosphoric acid into the soil.

2. A method for fertilizing soil which comprises the approximately simultaneous, but separate sub-surface injection into the soil of a plurality of liquid streams of an alkaline solution of ammonia and potash, and a phosphoric acid solution.

3. A soil fertilizing process which comprises directing a stream of ammonia toward the soil and blanketing the stream with an aqueous solution of potash during its passage toward the soil, applying the blanketed stream to the soil sub-surface, then sequentially and approximately simultaneously applying a solution of phosphoric acid to the soil subsurface in the same soil area to which the blanketed stream of ammonia has been applied.

4. A method for adding fertilizer to the soil which comprises moving over the soil a plurality of approximately simultaneous, but separate liquid streams flowing towards the soil and applying to the soil sequentially chemically reactive solutions, one of said solutions being an alkaline fertilizing solution and the other being an acidic fertilizing solution, the sequential introduction of the solutions, with the alkaline solution penetrating first into the soil to the largest possible extent producing an upsetting of the chemical equilibrium of the soil, before being reached by the acidic solution, the alkaline and acidic solution reacting thereafter in the soil with each other and with the soil chemicals to form fertilizing mixtures, readily available to the plants.

5. A method of fertilizing soil which comprises moving over the soil two approximately simultaneous but separate liquid streams flowing towards and applied by injection to the subsurface of the soil sequentially, one stream containing liquid ammonia and the other a solution of phosphoric acid, the sequential injection into the subsurface of the soil of the solutions, with the alkaline solution penetrating first into the subsurface to the largest possible extent, producing an upsetting of the chemical equilibrium of the soil before being reached by the acidic solution, the ammonia and phosphoric solutions thereafter reacting in the soil to form ammonium phosphate and reacting with the soil chemicals to form additional ammonium salts and phosphates, readily available to the plants on account of the preceding upsetting of the chemical equilibrium of the soil.

References Cited in the file of this patent

UNITED STATES PATENTS

| | | |
|---|---|---|
| 380,189 | Clemm | Mar. 27, 1888 |
| 1,173,534 | Ryan | Feb. 29, 1916 |
| 1,667,923 | Bishop | May 1, 1928 |
| 1,777,391 | Brewer | Oct. 7, 1930 |
| 1,868,913 | Prizer et al. | July 26, 1932 |
| 1,991,851 | Hammell | Feb. 19, 1935 |
| 2,028,172 | Sweek | Jan. 21, 1936 |
| 2,038,316 | Rosenstein | Apr. 21, 1936 |
| 2,088,869 | Porter | Aug. 3, 1937 |
| 2,415,251 | Leavitt | Feb. 4, 1947 |
| 2,424,520 | Tonkin | July 22, 1947 |
| 2,650,556 | Turner | Sept. 1, 1953 |

FOREIGN PATENTS

| | | |
|---|---|---|
| 456,154 | France | June 12, 1913 |
| 596,789 | France | Aug. 17, 1925 |
| 21,581 | Germany | May 8, 1883 |
| 142,953 | Great Britain | May 20, 1920 |